(12) United States Patent
Anson et al.

(10) Patent No.: US 9,532,565 B2
(45) Date of Patent: Jan. 3, 2017

(54) WATERFOWL HUNTING DECOY

(71) Applicants: Bryan Anson, Clinton, IA (US); Kevin James, Clinton, IA (US)

(72) Inventors: Bryan Anson, Clinton, IA (US); Kevin James, Clinton, IA (US)

(*) Notice: Subject to any disclaimer, the term of this patent is extended or adjusted under 35 U.S.C. 154(b) by 0 days.

(21) Appl. No.: 14/694,027

(22) Filed: Apr. 23, 2015

(65) Prior Publication Data
US 2015/0313207 A1 Nov. 5, 2015

Related U.S. Application Data

(60) Provisional application No. 61/986,189, filed on Apr. 30, 2014.

(51) Int. Cl.
*A01M 31/06* (2006.01)
*F16M 11/00* (2006.01)

(52) U.S. Cl.
CPC .............. *A01M 31/06* (2013.01); *F16M 11/00* (2013.01)

(58) Field of Classification Search
CPC ............................. A01M 31/06; A01M 31/00
USPC ........................................................ 43/2, 3
See application file for complete search history.

(56) References Cited

U.S. PATENT DOCUMENTS

| | | | | |
|---|---|---|---|---|
| 2,268,963 A * | 1/1942 | Riddell | ................ | A01M 31/06 43/3 |
| 4,435,913 A * | 3/1984 | Messina | ................ | A01M 31/06 43/3 |
| 6,336,286 B1 * | 1/2002 | Liechty, II | ............ | A01M 31/06 43/2 |
| 7,337,575 B2 * | 3/2008 | Hulley | .................. | A01M 31/06 43/3 |
| 7,568,305 B2 | 8/2009 | Fanfelle | | |
| 7,861,453 B2 * | 1/2011 | Priest | .................... | A01M 31/06 43/2 |
| 8,127,487 B2 | 3/2012 | Gazalski | | |
| 8,136,288 B1 | 3/2012 | Shope | | |
| 2005/0268522 A1 | 12/2005 | Foster et al. | | |
| 2006/0283071 A1 * | 12/2006 | Haley | .................. | A01M 31/06 43/3 |
| 2013/0111800 A1 | 5/2013 | Pifer et al. | | |

* cited by examiner

*Primary Examiner* — Joshua Huson
(74) *Attorney, Agent, or Firm* — Global Intellectual Propery Agency, LLC; Daniel Boudwin

(57) ABSTRACT

A waterfowl hunting decoy device that can be configured for use on water or dry land. The waterfowl hunting decoy device has a buoyant body resembling a waterfowl and includes a keel on an underside surface thereof for stabilizing the decoy device while in water. The decoy device further includes a leg support having a base member resembling the underside of a waterfowl, wherein the base member can removably receive the body therein. Further, a foot member is tethered to the body and can be removably secured to the leg support in order to stabilize the decoy device on dry land. The foot member also serves as an anchor when the decoy device is used in the water. Thus, the present invention provides a decoy that can be configured to resemble a waterfowl standing on dry land or floating on water.

5 Claims, 3 Drawing Sheets

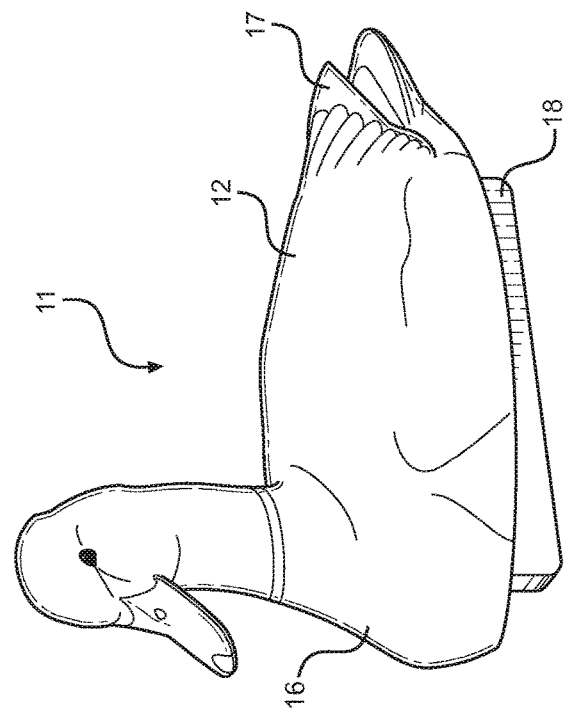
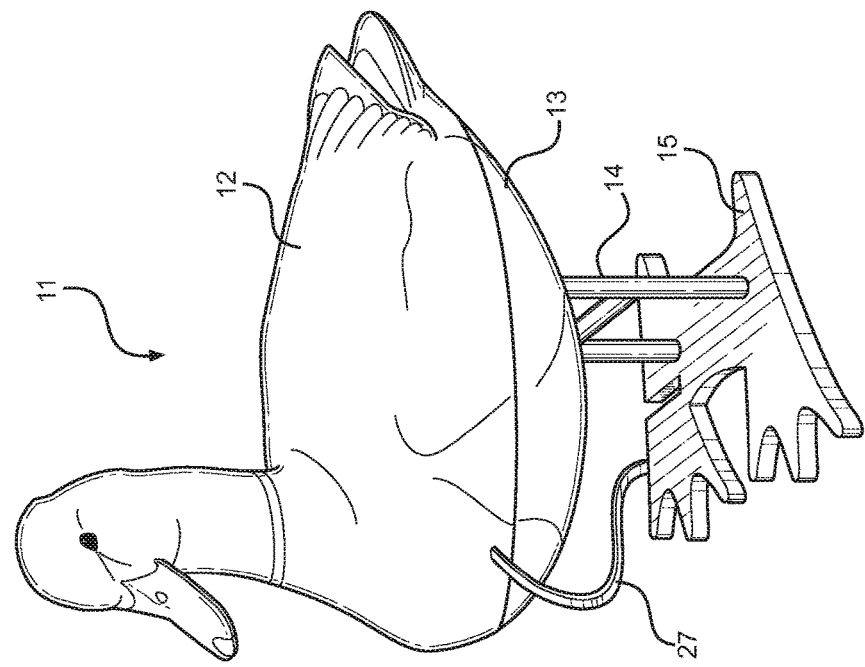

WATERFOWL HUNTING DECOY

CROSS REFERENCE TO RELATED APPLICATION

This application claims the benefit of U.S. Provisional Application No. 61/986,189 filed on Apr. 30, 2014. The above identified patent application is herein incorporated by reference in its entirety to provide continuity of disclosure.

BACKGROUND OF THE INVENTION

Field of the Invention

The present invention relates to hunting decoys. More specifically, the present invention provides a waterfowl hunting decoy that can be reconfigured for use on water or land as desired by the user. The waterfowl hunting decoy comprises a buoyant body resembling a waterfowl, wherein the body comprises a keel on the underside thereof so that the decoy device can float on water and remain in an upright position. A leg support is provided that can be removably secured to the underside of the body, wherein a foot member can be removably secured to the leg support so as to allow the decoy to stand upright on land.

Waterfowl hunters often use decoys in order to lure waterfowl, such as ducks and geese, within the range of the hunters. Some waterfowl hunters choose to use floating decoys and place the decoys on a body of water in order to attract the waterfowl. On other occasions, the hunters instead use land decoys that resemble waterfowl standing on dry land. Given the importance of using decoys in order to attract waterfowl to the hunters, some hunters may hunt using a variety of different types of decoys for use on water or land. However, carrying and transporting multiple types of decoys can be cumbersome and inconvenient. Thus, a waterfowl hunting decoy that can be used on dry land or on water is desired in order to reduce the number of items that a hunter must carry while hunting.

Devices have been disclosed in the prior art that relate to waterfowl hunting decoys. These include devices that have been patented and published in patent application publications. These devices generally relate to stands for supporting floating decoys on dry land. U.S. Pat. No. 8,127,487 and U.S. Published Patent Application Number 2013/0111800 provide floating decoys that can be alternately configured for use on land. Other devices provide supports for positioning floating decoys on land, such as U.S. Published Patent Application Number 2005/0268522, U.S. Pat. Nos. 7,568,305, and 8,136,288.

These prior art devices have several known drawbacks. Many devices in the prior art provide only a stand on which a conventional floating waterfowl decoy can be positioned. However, such stands may not be suitable for all varieties of floating waterfowl decoys, and the stands fail to provide the appearance of a waterfowl standing on land. The devices in the prior art fail to disclose a waterfowl hunting decoy comprising a body resembling a waterfowl and having a keel on the underside surface thereof, and wherein the body can be secured on a leg support having a removable foot member.

In light of the devices disclosed in the prior art, it is submitted that the present invention substantially diverges in design elements from the prior art and consequently it is clear that there is a need in the art for an improvement to existing waterfowl hunting decoy devices. In this regard the instant invention substantially fulfills these needs.

SUMMARY OF THE INVENTION

In view of the foregoing disadvantages inherent in the known types of waterfowl hunting decoys now present in the prior art, the present invention provides a new waterfowl hunting decoy wherein the same can be utilized for providing convenience for the user when providing waterfowl hunters with a decoy that can be configured for use on dry land or water as desired.

It is therefore an object of the present invention to provide a new and improved waterfowl hunting decoy device that has all of the advantages of the prior art and none of the disadvantages.

It is another object of the present invention to provide a waterfowl hunting decoy device comprising a body resembling a waterfowl, wherein the body is buoyant and includes a keel on the underside thereof.

Another object of the present invention is to provide a waterfowl hunting decoy device wherein a leg support can be removably secured to the body of the waterfowl decoy for use in supporting the waterfowl decoy on dry land.

Yet another object of the present invention is to provide a waterfowl hunting decoy device wherein a foot member is tethered to the body and is securable to the leg support for stabilizing the waterfowl hunting decoy in an upright position.

A further object of the present invention is to provide a waterfowl hunting decoy device that resembles a waterfowl floating in water or standing on dry land, depending upon the configuration of the device.

Another object of the present invention is to provide a waterfowl hunting decoy that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows a perspective view of the waterfowl hunting decoy as configured for use on land.

FIG. 2 shows a perspective view of the body of the waterfowl hunting decoy.

DETAILED DESCRIPTION OF THE INVENTION

Figure 3:
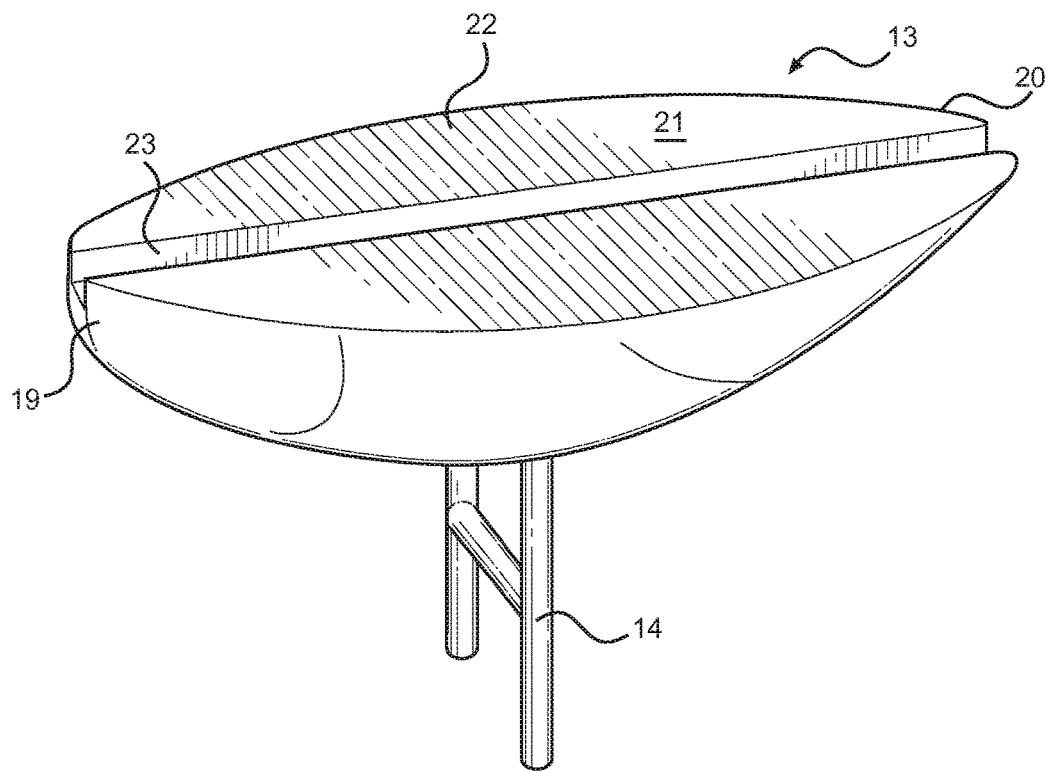
FIG. 3 shows a view of the leg support of the waterfowl hunting decoy.

Reference is made herein to the attached drawings. Like reference numerals are used throughout the drawings to depict like or similar elements of the waterfowl hunting decoy. For the purposes of presenting a brief and clear description of the present invention, the preferred embodiment will be discussed as used for providing a waterfowl hunting decoy that can be configured for use on land or water as desired by the user. The figures are intended for representative purposes only and should not be considered to be limiting in any respect.

Referring now to FIG. 1, there is shown a perspective view of the waterfowl hunting decoy as configured for use on land. The waterfowl hunting decoy 11 comprises a body 12 resembling a waterfowl, such as a duck or goose, among various other types of waterfowl. The body 12 is buoyant so that the body 12 of the waterfowl can float on the surface of a body of water. Further, a keel is positioned on the underside surface of the body 12 to help stabilize the body 12 in an upright configuration while floating on the water. The body 12 can be mounted on a leg support 13 comprising a base member that resembles the underside of a waterfowl and a pair of legs 14. The body 12 is adapted to be positioned directly on the base member of the leg support 13, and the base member includes a channel in which the keel of the body 12 can be positioned. Further, a foot member 15 is removably secured to the lower end of the pair of legs 14 and is adapted to stabilize the waterfowl decoy device 11 when use on dry land. The foot member 15 is connected to the body 12 via an elongated, flexible tether 27 to prevent the foot member 15 from becoming separated and to serve as an anchor when the decoy device 11 is used in water.

Referring now to FIG. 2, there is shown a perspective view of the body of the waterfowl decoy device. The body 12 resembles the midsection, neck and head of a waterfowl, so as to resemble a waterfowl floating or wading on the surface of a body of water. The body 12 comprises a front end 16 and a rear end 17. Further, the underside surface of the body 12 is substantially flat. A keel 18 extends downward from the flat underside surface of the body 12. The keel 18 is preferably an elongated member that extends from the front end 16 of the body 12 to the rear end 17 thereof. The keel 18 is positioned centrally on the body 12 so that the decoy device 11 can remain in an upright position and is stable on the surface of the water so that it does not tip over or fall over. The body 12 can be composed of any of various buoyant materials, such as a foam or plastic.

Referring now to FIG. 3, there is shown a perspective view of an embodiment of the leg support 13 of the present invention. In order to use the decoy device on dry land, the leg support 13 must be removably secured to the body of the decoy device. The leg support 13 comprises a base member 22 having a front end 19, a rear end 20, and a flat upper surface 21. The base member 22 further includes a channel 23 extending from the front end 19 thereof towards the rear end 20. The channel 23 is positioned centrally on the base member 22 and is adapted to receive the keel of the body therein. Thus, the keel can be positioned within the channel 23 of the base member 22 and the underside surface of the body can be positioned flush against the upper surface 21 of the base member 22.

The leg support 13 resembles the underside or underbelly of a waterfowl. In this way, when the leg support 13 is positioned beneath the body of the waterfowl decoy, a continuous surface is formed so that the decoy device can more closely resemble a waterfowl standing on dry land. The leg support 13 is preferably colored or patterned in the same manner as the body.

A pair of legs 14 extends downward from the base member 22. The legs 14 are preferably substantially linear and are parallel to one another. The legs 14 are connected to one another via a horizontal crossbar so as to stabilize the pair of legs 14. However, in alternate embodiments, the legs may have a slight bend so that the decoy device resembles a waterfowl standing in different positions. The legs 14 can be colored or patterned similarly to that of a waterfowl to provide a realistic appearance.

Figure 4:
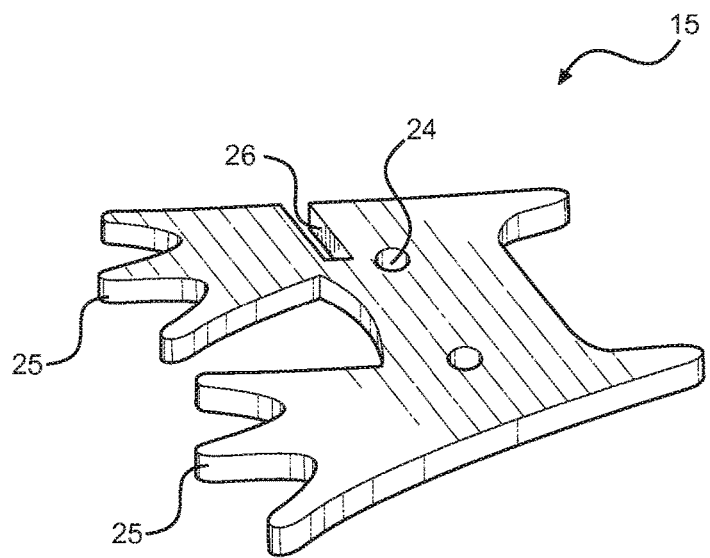
FIG. 4 shows a view of the foot member of the waterfowl hunting decoy.

Referring now to FIG. 4, there is shown a view of the foot member of the waterfowl hunting decoy device. The foot member 15 resembles a pair of feet 25 connected to one another so that that foot member 15 comprises a unitary structure. The foot member 15 includes a pair of openings 24 thereon for receiving the pair of legs 14. In this way, the foot member 15 can be positioned in a horizontal orientation, flush against the surface of the ground, and the legs can extend perpendicularly upward therefrom. The legs can be secured to the foot member 15 via press fit or frictional engagement. Thus, the foot member 15 can be easily secured to and removed from the pair of legs.

Figure 5:
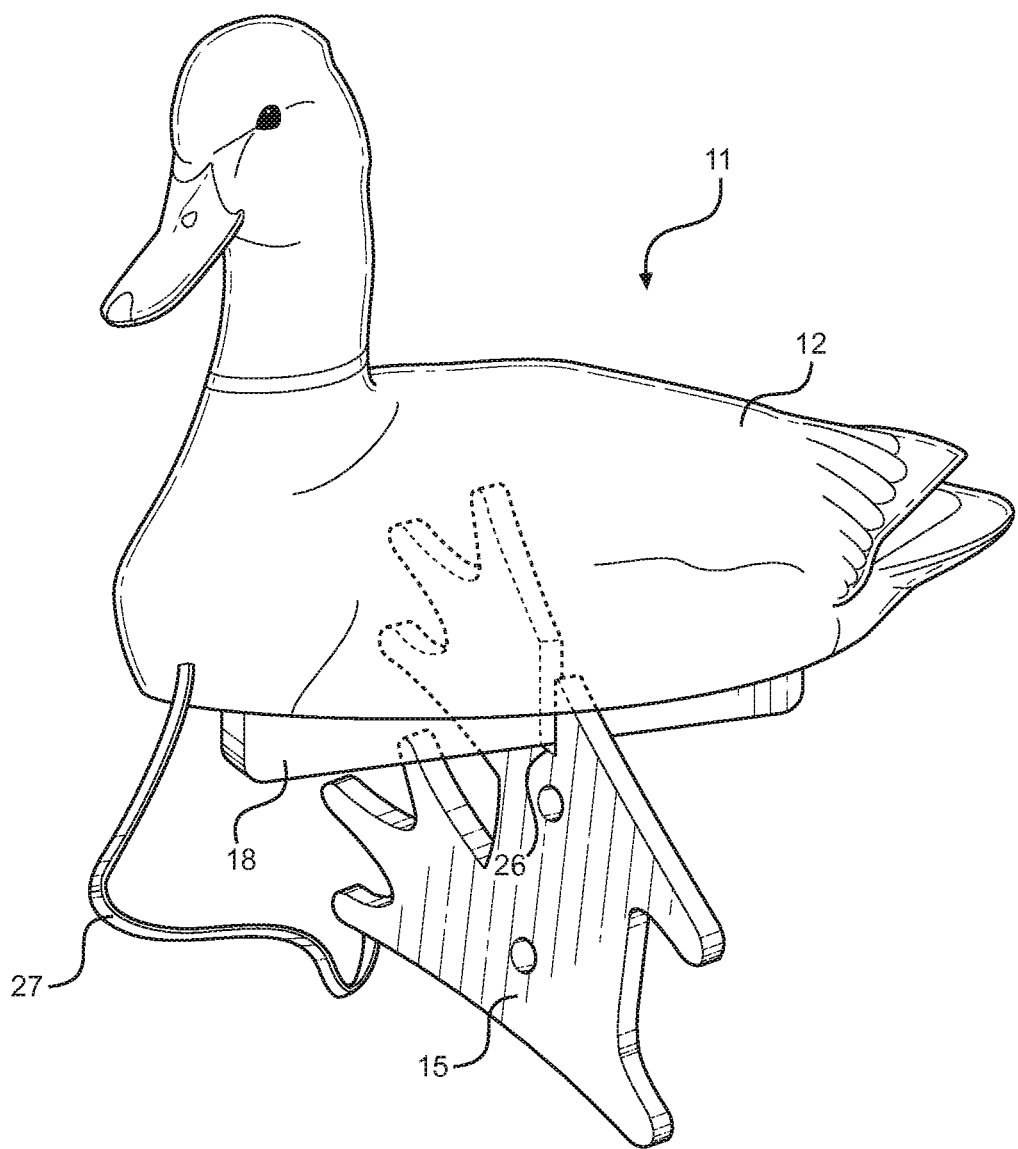
FIG. 5 shows a view of the waterfowl hunting decoy with the foot member in a stored configuration.

Referring now to FIG. 5, there is shown a view of the waterfowl hunting decoy device in a stored configuration. The foot member 15 further includes a notch 26 on a side thereof. The notch 26 is adapted to removably engage with the keel 18 of the body 12 via a press fit or frictional connection. In this way, the foot member 15 can be secured to the keel 18 of the body 12 for storage when the decoy device is not in use. The foot member 15 can be easily removed from the keel 18 for use as an anchor when the device is used in water, or as a base when the device is used on land.

Further, the foot member 15 is preferably connected to the body of the decoy device via a tether 27. The tether 27 is an elongated flexible cable that is preferably composed of a corrosion resistant and durable material. In this way, the foot member 15 can serve as an anchor when the decoy device is used to float on the surface of a body of water. The foot member 15 will sink to the bottom of the body of water so as to restrain the movement of the decoy device and to avoid the decoy device moving out of position because of current or wind.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A waterfowl hunting decoy device, comprising:
   a body resembling a waterfowl having a keel on an underside surface thereof, wherein said keel extends from a front end of said body towards a rear end thereof, and wherein said keel is positioned centrally on said underside surface of said body;

a leg support comprising a base member and a pair of legs;

wherein said base member includes an elongated channel adapted to removably receive said keel therein for securing said body to said leg support in a first configuration;

a foot member removably securable to said pair of legs, wherein said foot member is adapted to stabilize said body and said leg in said first configuration;

a notch disposed on said foot member wherein said notch is disposed on a lateral edge of said foot member;

wherein said notch removably receives said keel therein, such that said foot member is perpendicular relative to said keel in a second configuration.

2. The waterfowl hunting decoy device of claim 1, wherein said body is buoyant.

3. The waterfowl hunting decoy device of claim 1, wherein said base member resembles the underside of a waterfowl and is adapted to form a continuous surface when said body is positioned on said base member.

4. The waterfowl hunting decoy device of claim 1, wherein said foot member comprises a pair of openings adapted to receive said pair of legs therein.

5. The waterfowl hunting decoy device of claim 1, wherein said foot member is secured to said body via an elongated tether, wherein said foot member is adapted to serve as an anchor when said body is used in water.

* * * * *